Patented May 7, 1935

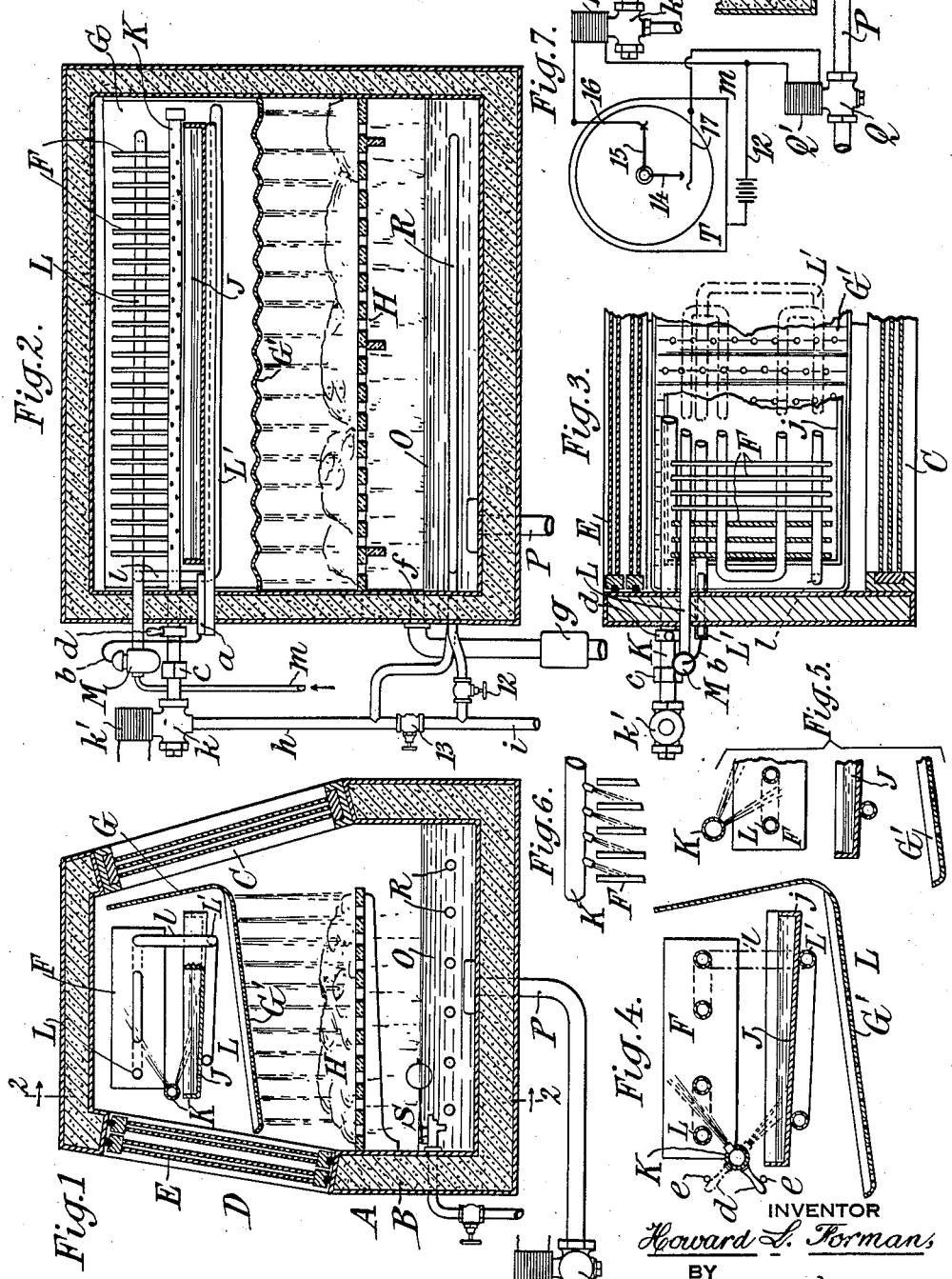

2,000,440

UNITED STATES PATENT OFFICE 2,000,440

REFRIGERATING APPARATUS

Howard L. Forman, Kitchawan, N. Y.

Application December 23, 1933, Serial No. 703,714

17 Claims. (Cl. 62—104)

This invention relates to refrigerating apparatus for the preservation and display of such perishable products as require to be kept moist, including vegetables and other food products, and flowers. It is especially adapted for the preservation of fish.

Fish and similar articles of food are most commonly preserved and displayed for sale by placing them upon a layer of broken ice. Efforts have been made to substitute mechanical refrigeration, but this has involved difficulty, because the air within the refrigerator is kept too dry.

The present invention relates to refrigerating apparatus employing artificial or electric refrigeration together with means for periodically moistening the fish or other articles which are being preserved or displayed. Such moistening is accomplished by sprinkling or showering the fish or other products at stated intervals with ice cold water or other suitable liquid at a temperature slightly above the freezing point, sufficient to assure against the freezing of the fish or other products. Spraying with a refrigerating liquid has been heretofore applied for the purpose of freezing the articles being preserved, but this is not suitable for fish and many other substances, which would be injured by being frozen, unless by the "quick freezing" process.

According to the present invention, a refrigerating show case or other storage chamber having one or more shelves or trays on which the fish or other products are placed for preservation or display, is provided at its upper part with a refrigerating unit in the nature of a chill coil or other means for cooling the air and is provided with an inlet for water under pressure to a spray pipe or other means for sprinkling or showering cold water upon the fish or other products and with means associated with the chill coil for refrigerating this water in its flow from the inlet to the sprinkling or showering means. Means are provided for causing the showering operation to be performed at suitable intervals, say from one-half to three hours apart, under control of a clock or other timing device; and for arresting from time to time the flow of refrigerant to the chill coil for automatically defrosting this coil. The drip from such defrosting is caught in a tray beneath the chill coil in which ice may form, and this ice, or the cold water from such drip, is utilized for cooling the water which is to be showered over the perishable products. This water is otherwise cooled by directing it over the chill coil, or by carrying its pipe into contact with such coil. The chilled water is distributed or showered over the perishable products by flowing it over an inclined baffle plate having grooves or channels down which the water runs, and perforations therein for letting the water escape in a shower. This water may be caught in a bath at the bottom of the case and utilized to preliminarily cool the entering water.

The apparatus is useful not only for preserving perishable products without freezing them but also for the slow thawing of frozen products, especially those which have been preserved by the "quick freezing" process, being that process in which the products are subjected to an extremely low temperature which congeals their outer cells so rapidly as to avoid material injury to the organic cell structure. Such food products thawed in the refrigerating apparatus of this invention are restored so gradually to normal condition that they are indistinguishable from fresh or unfrozen products and may be preserved unchanged for days or even weeks in this apparatus.

The accompanying drawing illustrates a preferred embodiment of this invention.

Fig. 1 is a vertical transverse section.

Fig. 2 is a vertical longitudinal section taken generally on the line 2—2 of Fig. 1.

Fig. 3 is a horizontal section showing the internal apparatus in plan.

Fig. 4 is a section of the chill coil and associated parts of Fig. 1 on a larger scale.

Fig. 5 is a similar view to Fig. 4, but showing a modified arrangement of the admission pipe.

Fig. 6 is a fragmentary plan of the chill coil and spray pipe.

Fig. 7 is a diagrammatic view showing the electrical timing means for operating the valves.

Referring to the drawing, A is the refrigerator case, which may be of any usual or suitable construction, having the customary inner and outer walls with a non-conducting filling B between them. It is preferably a display case having a large front opening C covered with triple plate glass for conserving the internal temperature. At the back is an opening D for getting access to the interior, which may be closed by one or more doors or windows E, which may be of the hinged or sliding type. Within the case is a shelf or other support H, on which the fish or other perishable food products or other substances may be placed, preferably in position for display through the front window C.

Within or in communication with the refrigerator chamber, and usually in the upper part thereof as shown, is a refrigerating unit or element F adapted for suitably cooling the air within the chamber, and which will be hereinafter referred to as the "chill coil", although it may be of any construction adapted for the purpose. It is suitably hung or supported so that the warm air may freely ascend to it and the air cooled or chilled thereby may descend from it through the chamber. For directing the flow of the circulating air, a baffle plate G of essentially usual construction is provided, its lower portion G' being inclined to direct the ascending air toward one side (the front in the construction shown) and thence to the top of the chamber, while the descending air is caught by the same inclined portion of the baffle plate and directed to the opposite side (or rear) thereby maintaining an effective circulation of cold air within the chamber. The chill coil is fed with refrigerant at such temperature and rate as to maintain it normally slightly below the freezing point, say about 25° F. or −4° C., in order to keep the air within the chamber at a temperature approximating, or slightly exceeding, about 35° F. or +2° C., this temperature, however, being variable according to conditions.

The chill coil may be elsewhere arranged, but in such case the air circulation may require to be forced by the provision of a fan or other circulating means.

The chill coil is provided with automatic defrosting means whereby the flow of refrigerant is cut off at intervals to permit the ice congealing on the surfaces of the chill coil to thaw and drip off; and during these periods of thawing the temperature of the enclosed air rises somewhat.

Beneath the chill coil is hung a drip tray J, arranged to receive the drip from the chill coil during defrosting and hold this water so that in the intervals between defrosting periods it may freeze and thereby present a tray of ice, or at times of water at nearly the congealing temperature. This tray is sloped forward so that the water overflowing from it falls over its front wall $j$ and drops onto the sloping bottom G' of the baffle plate. It is desirable that this tray shall have refrigerating means applied to cool it.

The water for spraying or showering the perishable products is introduced into the refrigerator through a pipe K whenever a control valve $k$ is opened. The pipe K is shown as having perforations (or small nozzles) through which the water is discharged uniformly from end to end. The pipe K is extended into and through the refrigerator in such association with the chill coil F that the entering water shall be chilled therefrom. This may be done in several ways, as by carrying the pipe through in contact with the plates or sections of the chill coil; or by directing its perforations or nozzles to cause the jets of water to impinge upon and flow over the surfaces of such plates or sections to be cooled thereby. The water thus admitted is received in the tray J and commingles with the frigid water or overflows the ice therein, as the case may be. Thus the entering water is thoroughly chilled, either directly from the chill coil or as the result of its refrigerating effect by contact or mixture with the ice or water in the tray. The chilled water overflowing from the tray falls upon the baffle plate and runs down its sloping bottom G', which is perforated to distribute the water in a shower, rain or spray upon the perishable products on the shelf H. For better distributing the water its flow down the baffle is controlled by forming the baffle with grooves or channels which cause the water to flow in parallel streams, and the perforations are formed in the bottoms of the troughs or channels, the perforations in different troughs being staggered or otherwise differently arranged to effect a thorough separation and distribution of the jets or dripping water falling from the respective perforations.

In the construction shown the chill coil F has a refrigerating pipe L containing a refrigerating vapor admitted through an expansion valve M supplied with a refrigerating liquid or compressed vapor from a pipe $m$. The pipe L is extended in a coil through or in contact with the plates or sections of the chill coil, and in order to cool the tray J it is extended at $l$ downwardly and is looped beneath the tray J in a loop or extension coil L'. The outlet of the pipe L' is provided with a thermostat $a$ connected by a tube $b$ with the expansion valve M so that the admission of refrigerating vapor is controlled thermostatically in a well known manner whereby the chill coil is refrigerated intermittently to such effect that the supply of refrigerant is cut off at intervals whenever the temperature at the discharge from L' reaches its minimum. This results in an automatic defrosting of the chill coil so that the ice congealed thereon is thawed off and drips into the tray J. When this thawing has proceeded sufficiently the rising temperature reopens the inlet valve M and the chill coil is again cooled.

In Fig. 4 the water pipe K is shown as oscillatable so that its spray can be directed downwardly into the tray J or upwardly against the surfaces of the sections of the chill coil F. For this purpose the pipe K is connected to the service pipe through a swivel coupling $c$ (Fig. 2) and has fixed to it a handle or lever $d$ shown in full and dotted lines in Fig. 4 in two positions, where it is turned up or down against one or other of two stops $e$ in order to direct its jets downwardly or upwardly. Thus the operator can at will control the cooling of the entering water either by direct contact with the chill coil or by discharge only beneath the same into the tray J.

Fig. 6 shows the oblique nozzles of the pipe K through which the jets are directed laterally onto the surfaces of the chill coil plates.

The inlet valve $k$ may be operated manually, but preferably is provided with means for operating it at stated intervals of time or under other intermittent control. It is shown as an electrically operated valve having a solenoid $k$ in a suitably controlled electric circuit.

An alternative construction or arrangement of the water pipe K is shown in Fig. 5, where the pipe is lettered K' and is mounted above the chill coil F, and has perforations directing jets downwardly to flow over the plates of this coil and drip therefrom into the tray J.

Any operative association of the water pipe K with the chill coil F or equivalent refrigerating means whereby the one admission of refrigerating liquid or vapor is utilized for cooling both the chill coil and the entering water will be within the intent of the present invention.

The water dripping from the perishable products is received in the closed bottom of the refrigerator chamber, from which it may be drained off as fast as it enters, through an outlet or waste pipe P. It is desirable, however, to utilize this water instead of wasting it, as the temperature will usually be considerably below that of water entering from the main. Accordingly, the outlet pipe P is normally closed by a valve Q so as to accumulate a pool of water O within the bottom of the refrigerator, up to the level of an overflow $f$ which may lead through a trap $g$ to waste. The cold pool O may be utilized for initially cooling the entering water by causing the latter to flow from the main through a coil R submerged in this pool, after which the water thus cooled flows by a pipe $h$ to the inlet valve $k$. The water from the main $i$ may be controlled in its flow by valves 12 and 13, so that it may either be circulated through the coil R or caused to flow directly to the pipe $h$ and valve $k$, according to the relative temperatures of the entering water and that in the pool O. It is desirable to provide an automatic float inlet valve S (Fig. 1) for insuring that the water in the pool O shall be kept up to the required level for the proper immersion of the coil R. It is desirable to empty the pool O at least once or twice a day, and for this purpose the valve Q is automatically operated in any suitable manner, manually or automatically.

The automatic operation of the valves $k$ and Q may be accomplished electrically, as shown in Fig. 7, where a clock T having an hour hand 14 and minute hand 15 is provided to close at any suitable time intervals the branches of an electric circuit $m$ which control the solenoids or electromagnets $k'$ and $Q'$. As shown, the minute hand 15 once each hour makes contact with a conducting spring 16 in the branch which includes the solenoid $k'$ and thereby admits showering water through the pipe K for a few minutes or seconds, as may be desired. Once every 12 hours the hour hand 14 contacts with a spring 17 which closes the branch of the circuit controlling the solenoid $Q'$ and thereby opens the drainage valve Q to drain off the pool O twice a day. Any other time intervals and any other timing mechanism may be substituted as desired. For fish, a shower for 20–30 seconds every 3 hours is preferable.

It will be understood that the invention is susceptible of such modification as may adapt it to varying conditions to be met in practice. It is applicable to any type of artificial or mechanical refrigeration and to any suitable refrigerant. These modifications are within the skill of refrigerating engineers.

What I claim is:

1. A refrigerator for perishable products having refrigerating means for cooling and circulating the air within it, means for admitting liquid, sprinkling means for discharging such liquid in a shower over such products, and means associated with said refrigerating means for cooling such liquid in transit and before it reaches the showering means to a temperature slightly above the freezing point, whereby to avoid freezing such products.

2. A refrigerator for perishable products having within its casing a chill unit for cooling the air, and means for admitting water adapted to conduct such water into cooling proximity to the chill unit, and thereby to cool the water to slightly above its freezing point, and means receiving the water so cooled adapted to shower it over such products.

3. A refrigerator for perishable products having within its casing a chill unit for cooling the air, and means for periodically cutting off the refrigerant from such unit to de-frost it, a tray beneath said unit for catching the drip from said unit, means for admitting liquid to be showered upon such products adapted to discharge such liquid into said tray and means for directing the overflow therefrom onto such products.

4. A refrigerator for perishable products having within the upper part of its casing a chill unit for cooling the air, and means for periodically cutting off the refrigerant from such unit to de-frost it, a tray located beneath said unit for catching the drip therefrom, means for admitting liquid with means for conducting the liquid into cooling proximity to the chill unit whereby to cool the liquid to slightly above the freezing point, and sprinkling means for showing such liquid upon the perishable products.

5. A refrigerator for perishable products having within its casing a chill coil for cooling the air, means for admitting water to be showered over such products, a tray located beneath said chill coil, receiving the drip therefrom, and means receiving the overflow from said tray and such water, adapted to discharge it in a shower upon such products.

6. A refrigerator for perishable products having within its casing a chill coil for cooling the air, and means for periodically cutting off the refrigerant from such coil to de-frost it, a tray beneath said coil for catching the drip from said coil, means for admitting water to be showered upon such products comprising a spray pipe extended adjacent the chill coil and directing its discharge into said tray, and means for distributing the overflow from said tray upon said products.

7. A refrigerator for perishable products having within its casing a chill coil for cooling the air, and means for periodically cutting off the refrigerant from such coil to de-frost it, a tray beneath said coil for catching the drip from said coil, means for admitting water to be showered upon such products comprising a spray pipe extended adjacent the chill coil and directing its discharge into contact with the chill coil whence it falls into said tray, and means beneath the tray for distributing the overflow from said tray upon said products.

8. A refrigerator according to claim 3, with the refrigerating means for cooling said chill unit having a portion thereof extended to cool said tray.

9. A refrigerator according to claim 1, the refrigerating means being a chill unit within the casing, with thermostatic means adapted to periodically cut off the supply of refrigerant to said chill unit for de-frosting it.

10. A refrigerator according to claim 2, combined with a baffle plate arranged mainly beneath the chill unit adapted to direct the ascending air around and over the chill unit, having its lower part beneath said unit which receives the cooled water falling therefrom perforated to distribute the same in a shower over such products.

11. A refrigerator according to claim 2, combined with a baffle plate arranged mainly beneath the chill unit adapted to direct the ascending air around and over the chill unit, having its lower part arranged to receive the cooled water therefrom formed with channels and perforations adapted to distribute the same over such products.

12. A refrigerator according to claim 1, with a valve for controlling the inflow of liquid, and timing means for periodically opening such valve.

13. A refrigerator according to claim 1, having at the bottom of its casing a pool receiving the cold liquid dripping from such products, and means associated with the means for admitting liquids, extended in contact with the liquid of such pool to preliminarily cool the entering liquid.

14. A refrigerator according to claim 1, having at its bottom a pool whereby the liquid dripping from such products is received in such pool, an outlet leading from such pool, and control means for periodically opening said outlet to drain the pool.

15. A refrigerator according to claim 1, having at its lower part a pool in which the liquid dripping from such products may be received, a valve controlling the admission of liquid and a valve controlling the discharge from said pool, with timing means and intervening connections therefrom for operating said valves to admit liquid at intervals and discharge the contents from said pool at intervals.

16. A refrigerator for perishable products having a chill unit for cooling the air within it, a tray located beneath said unit for catching the drip from said unit, and sprinkling means for distributing the overflow from said tray over said products.

17. A refrigerator for perishable products having a chill unit for cooling the air within it, means for periodically de-frosting such unit, a tray for catching the drip from said unit, and means for distributing the overflow from said tray over said products.

HOWARD L. FORMAN.